US012557803B2

(12) United States Patent
Oogose et al.

(10) Patent No.: US 12,557,803 B2
(45) Date of Patent: Feb. 24, 2026

(54) DRAG LEVER AND DUAL-BEARING REEL FOR FISHING

(71) Applicant: Shimano Inc., Sakai City (JP)

(72) Inventors: Hiroki Oogose, Sakai City (JP); Takeshi Ikuta, Sakai City (JP); Kunio Takechi, Sakai City (JP)

(73) Assignee: SHIMANO INC., Sakai City (JP)

( * ) Notice: Subject to any disclaimer, the term of this patent is extended or adjusted under 35 U.S.C. 154(b) by 227 days.

(21) Appl. No.: 18/478,344

(22) Filed: Sep. 29, 2023

(65) Prior Publication Data

US 2024/0138389 A1      May 2, 2024

(30) Foreign Application Priority Data

Oct. 31, 2022    (JP) ................................. 2022-174777

(51) Int. Cl.
*A01K 89/01*        (2006.01)
*A01K 89/033*       (2006.01)
(52) U.S. Cl.
CPC ................................. *A01K 89/047* (2015.05)
(58) Field of Classification Search
CPC .............. A01K 89/0192; A01K 89/057; A01K 89/058; A01K 89/059
See application file for complete search history.

(56) References Cited

U.S. PATENT DOCUMENTS

| | | | | |
|---|---|---|---|---|
| 7,850,110 B2 * | 12/2010 | Hirayama | ........ | A01K 89/01908 |
| | | | | 242/304 |
| 2011/0011966 A1 * | 1/2011 | Takechi | ............. | A01K 89/0192 |
| | | | | 242/255 |
| 2013/0161433 A1 * | 6/2013 | Takechi | ............... | A01K 89/059 |
| | | | | 242/243 |

FOREIGN PATENT DOCUMENTS

| | | | | | |
|---|---|---|---|---|---|
| JP | 4395409 B2 | * | 1/2010 | .......... | A01K 89/015 |
| JP | 3193871 U | * | 10/2014 | | |
| JP | 5961378 B2 | | 8/2016 | | |
| JP | 3209048 U | * | 3/2017 | | |

* cited by examiner

*Primary Examiner* — Emmanuel M Marcelo
(74) *Attorney, Agent, or Firm* — United IP Counselors, LLC

(57) ABSTRACT

A drag lever is configured to adjust a braking force of a drag mechanism configured to brake rotation of a spool, the drag lever including a mounting portion rotatably mounted on a reel body, an operation portion extending from the mounting portion in a radial direction of a pivot shaft and configured to swing in a first operation range, and an operation range adjustment member provided to the operation portion and configured to adjust the first operation range of the operation portion to a second operation range. This arrangement may suppress entanglement of a fishing line during fishing and adjusts the operation range of the drag lever.

8 Claims, 12 Drawing Sheets

DRAG LEVER AND DUAL-BEARING REEL FOR FISHING

CROSS-REFERENCE TO RELATED APPLICATIONS

This application claims priority to Japanese Patent Application No. 2022-174777, filed Oct. 31, 2022. The contents of that application are incorporated by reference herein in their entirety.

TECHNICAL FIELD

The present invention relates to a drag lever and a dual-bearing reel for fishing.

BACKGROUND ART

A configuration of a drag lever for a dual-bearing reel for fishing is known in which a protrusion protruding outward from a side surface of a reel body is provided and an operation range of the drag lever is defined by bringing the swung drag lever into contact with the protrusion (see, for example, JP 5961378 B).

BRIEF SUMMARY

In the above-described configuration, since the protrusion protrudes from the side surface of the reel body, there is a risk that the fishing line may become entangled on the protrusion during fishing. Because of this, there has been a need for a drag lever with an adjustable operation range that can suppress entanglement of a fishing line caused by the protrusion while fishing. In this respect, there is room for improvement in the prior art.

In addition, when a drag lever is configured for common use and used in another dual-bearing reel for fishing, the drag lever may come into contact with a reel body or the like, and consequently a desired operation range may not be achieved. Accordingly, there is room for improvement in view of preparing a drag lever for common use.

The present invention has been conceived in consideration of such circumstances, and an object thereof is to provide a drag lever with an adjustable operation range and a dual-bearing reel for fishing that can suppress entanglement of a fishing line.

(1) A first aspect of a drag lever according to the present invention is a drag lever configured to adjust a braking force of a drag mechanism configured to brake rotation of a spool, the drag lever including: a mounting portion rotatably mounted on a reel body; an operation portion extending in a radial direction of a pivot shaft from the mounting portion and configured to swing in a first operation range; and an adjustment portion attached to at least one of the mounting portion and the operation portion and configured to adjust the first operation range of the operation portion to a second operation range.

With the first aspect of the drag lever according to the present invention, a predetermined operation range of the drag lever can be set by the adjustment portion that is attached to at least one of the mounting portion and the operation portion, thereby making it possible to adjust the braking force of the drag mechanism. Therefore, the operation range may be adjusted from the first operation range to the second operation range by the adjustment portion so as to be at an intermediate position between a free position which is a drag release position and a maximum position where the braking force of the drag mechanism is in a maximum drag state.

In the present aspect, since the adjustment portion is attached to any one of the mounting portion and the operation portion of the drag lever, a configuration in which a protrusion for defining the operation range of the drag lever protrudes from a side surface of the reel body can be eliminated. This makes it possible to suppress entanglement of the fishing line on the side surface of the reel body during fishing.

Further, in the present aspect, since the adjustment portion is not attached to the side surface of the reel body as in the related art, the adjustment portion is not exposed on the reel body; consequently, the external appearance is not degraded and an excellent design is achieved.

In addition, when the drag lever is configured for common use and mounted on another reel, the operation range can be adjusted to a desired operation range by the adjustment portion in accordance with the shape of the other reel, and consequently the drag lever can be commonly used.

(2) In the drag lever of a second aspect of the present invention according to the first aspect, the adjustment portion is preferably mounted on at least one of the mounting portion and the operation portion in a relative position adjustable manner.

In this case, the operation range of the drag lever may be optionally adjusted by optionally changing the position of the adjustment portion relative to the operation portion.

(3) In the drag lever of a third aspect of the present invention according to the first aspect, the adjustment portion is preferably detachably mounted on at least one of the mounting portion and the operation portion.

In this case, since the adjustment portion is attachable to and detachable from the operation portion, the operation range of the drag lever can be optionally adjusted by selecting an appropriate adjustment portion among adjustment portions having different shapes and dimensions, for example, and mounting the selected adjustment portion on at least one of the mounting portion and the operation portion.

(4) In the drag lever of a fourth aspect of the present invention according to any one of the first to third aspects, the adjustment portion may be mounted on the operation portion and may change an operation range of the operation portion by making contact with the reel body.

In this case, the adjustment portion is attached to the operation portion that is displaced relative to the reel body by the swing operation on the drag lever, and the adjustment portion is adjusted to come into contact with the reel body at a predetermined swing position, thereby making it possible to set the swing to the operation range of the operation portion.

(5) In the drag lever of a fifth aspect of the present invention according to any one of the first to fourth aspects, the adjustment portion may be mounted on a first surface facing the reel body of the operation portion.

In this case, since the adjustment portion is mounted on the first surface facing the reel body, exposure of the adjustment portion to the outside of the reel can be suppressed, and entanglement of a fishing line on the adjustment portion can be more reliably suppressed.

(6) In the drag lever of a sixth aspect of the present invention according to any one of the first to fifth aspects, the operation portion may include a first positioning portion on the first surface facing the reel body of the operation portion, and the reel body may include, on a second surface facing the operation portion, a second positioning portion config-
ured to be engaged with the first positioning portion.

In this case, the drag lever may be positioned, for
example, at an intermediate position between the free posi-
tion and the maximum position by positioning the first
positioning portion of the operation portion at the second
positioning portion attached to the reel body.

(7) In the drag lever of a seventh aspect of the present
invention according to the sixth aspect, the first positioning
portion may include an engagement pin movable toward and
away from the second surface, and a holding portion con-
figured to hold the engagement pin, and the second posi-
tioning portion may include a concave-convex portion that
is formed along a swing direction of the mounting portion
and engages with the engagement pin.

In this case, since the engagement pin is configured to
rotate together with the swing of the operation portion, is
held by the holding portion such that it can move forward
and backward, and is engageable with the concave-convex
portion of the mounting portion, the engagement pin
engages with the concave-convex portion in accordance
with the swing position. Therefore, by disposing the con-
cave-convex portion over the entire operation range, the
drag lever can be positioned stepwise in the operation range.

(8) In a drag lever of an eighth aspect of the present
invention according to the sixth aspect, the adjustment
portion may be provided close to the holding portion.

In this case, since the adjustment portion and the holding
portion are provided in the operation portion, the operation
portion does not have a complicated structure, and a member
protruding from the operation portion can be eliminated,
thereby making it possible to prevent entanglement of a
fishing line on the operation portion or the adjustment
portion during fishing.

(9) A ninth aspect of a dual-bearing reel for fishing
provided with the drag lever according to the present inven-
tion may include the drag lever of any one of the first to
eighth aspects.

In this case, the dual-bearing reel for fishing having the
effects of the above-described drag lever may be provided.

With the drag lever and the dual-bearing reel for fishing
according to the present invention, entanglement of a fishing
line during fishing may be suppressed, and the operation
range of the drag lever may be adjusted.

DETAILED DESCRIPTION

Hereinafter, an embodiment of a drag lever and a dual-
bearing reel for fishing according to the present invention
will be described with reference to the drawings. In the
drawings, the scale of each constituent member may be
appropriately changed as necessary so that each constituent
member has a visible size. In the present embodiment, as a
dual-bearing reel for fishing, a baitcasting reel will be cited
as an example and explained.

Overall Configuration

Figure 1:
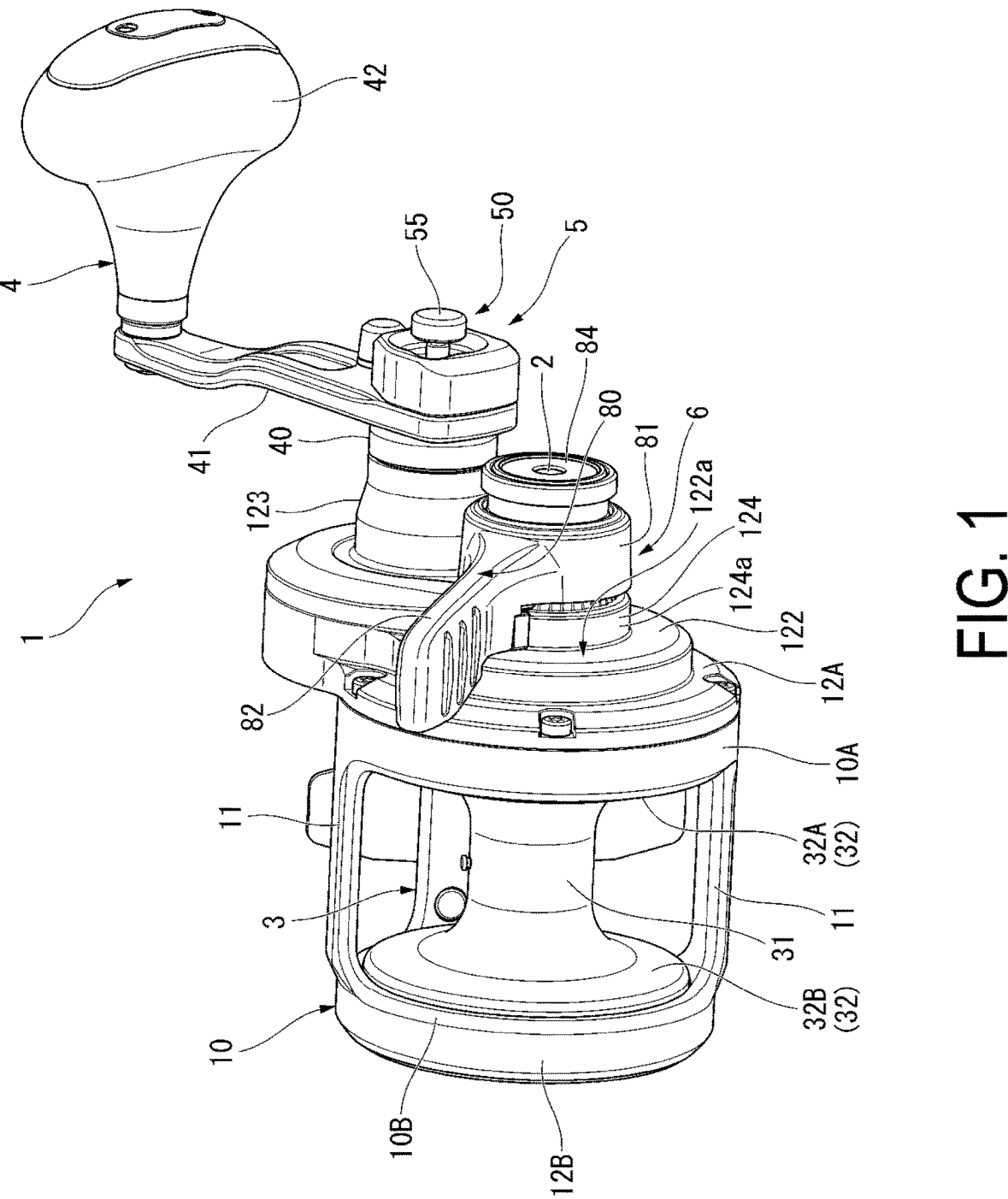
FIG. 1 is a diagram illustrating an embodiment of the
present invention and is a perspective view of a baitcasting
reel.
Figure 2:
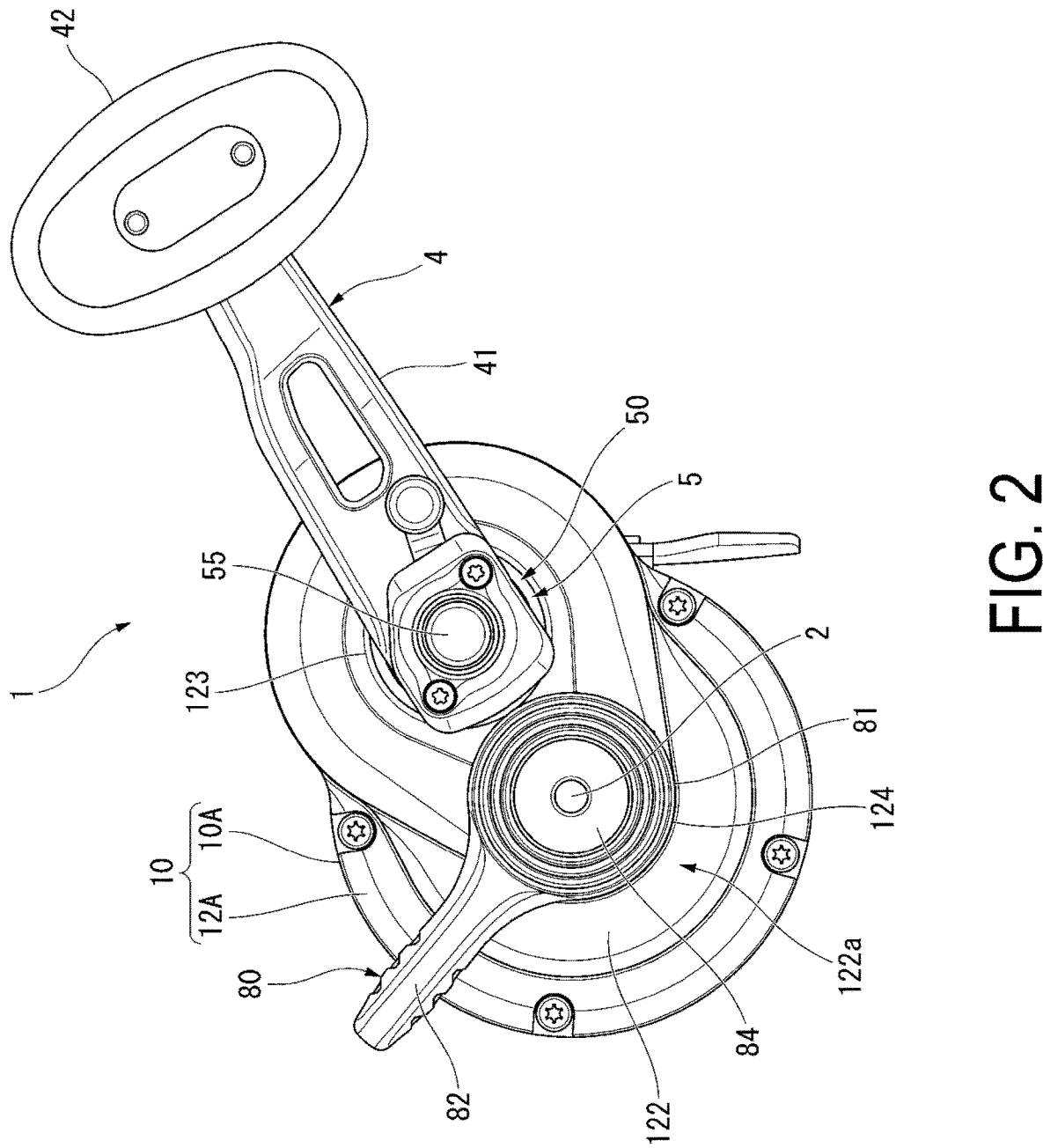
FIG. 2 is a side view of the baitcasting reel illustrated in
FIG. 1 as seen from a side of a handle.

As illustrated in FIGS. 1 and 2, a dual-bearing reel for
fishing (hereinafter referred to as a baitcasting reel 1) of the
present embodiment is a medium-sized lever drag reel that
can wind a fishing line. The baitcasting reel 1 includes a drag
lever 80 for adjusting a braking force of a drag mechanism
6 configured to brake rotation of a spool 3.

Figure 3:
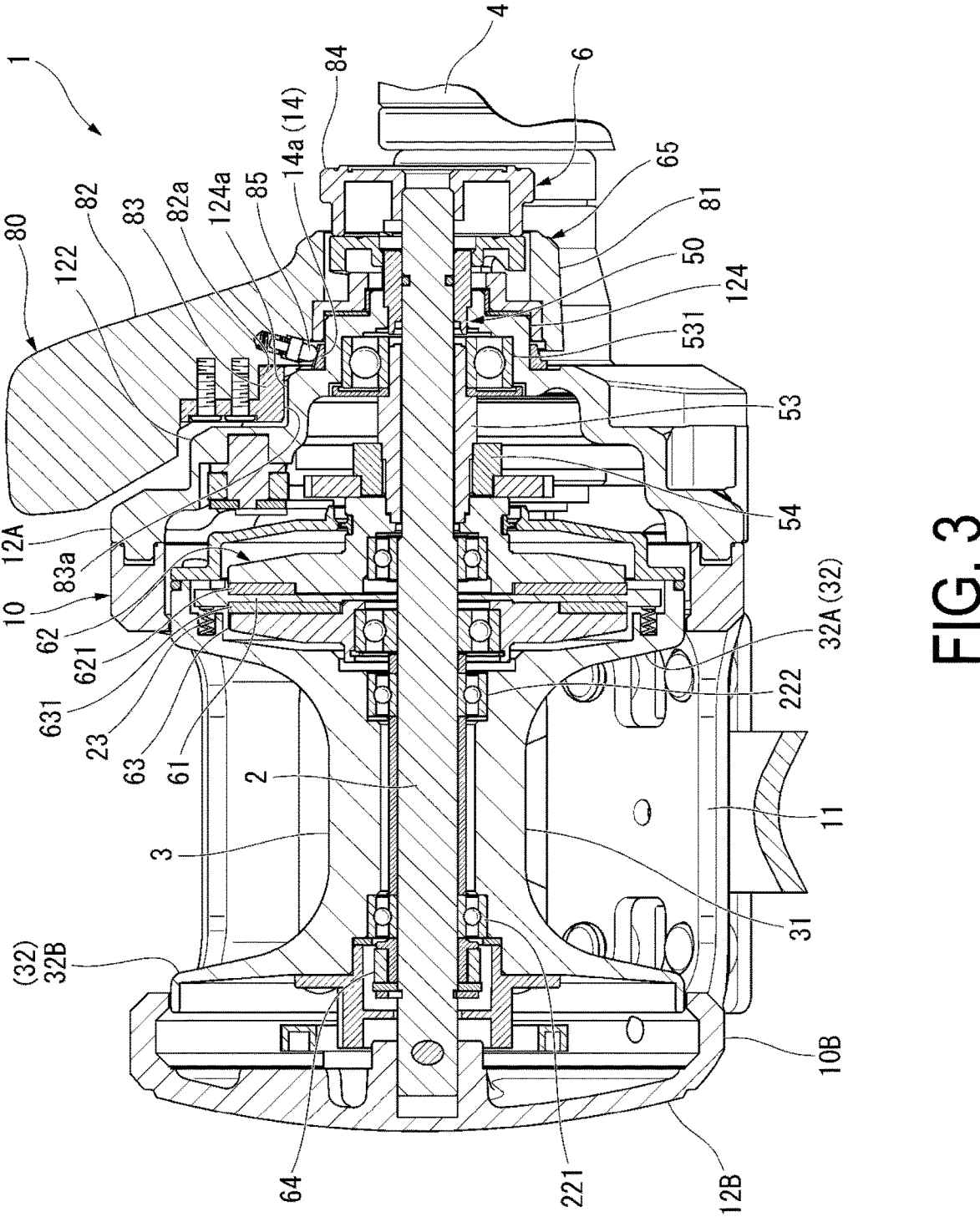
FIG. 3 is a cross-sectional view of the baitcasting reel
illustrated in FIG. 1.

The baitcasting reel 1 includes a reel body 10 formed in
a tubular shape, a spool shaft 2 attached to a central portion
of the reel body 10 to be non-rotatable and to be movable in
an axial direction, the spool 3 supported by the spool shaft
2 to be rotatable and to be immovable in the axial direction,
and a handle 4 disposed at a side of the reel body 10. As
illustrated in FIG. 3, the baitcasting reel 1 includes, inside
the reel body 10, a rotation transmission mechanism 5
configured to transmit the rotation of the handle 4 to the
spool 3, and a drag mechanism 6 configured to brake the
rotation in a reel-out direction of the spool 3.

Reel Body

The reel body 10 includes a right side plate 10A and a left
side plate 10B, which are made of metal and paired with
each other; a plurality of coupling portions 11 configured to
couple the right side plate 10A and the left side plate 10B at
the front and rear, and at a lower portion; a right cover
member 12A covering the outer side of the right side plate
10A; and a left cover member 12B formed integrally with
the left side plate 10B to cover the outer side of the left side
plate 10B.

The coupling portion 11 is integrally formed with a rod
mounting portion 13 for mounting the baitcasting reel 1 on
a fishing rod. The right side plate 10A, the left side plate
10B, the coupling portion 11, and the left cover member 12B
are integrally formed by metal-cutting.

As illustrated in FIG. 1, the right cover member 12A is
made of metal and covers the outer side of the right side
plate 10A. The right side plate 10A and the left side plate
10B have openings through which the spool 3 can pass.
Inside the left cover member 12B, there is formed a boss
portion (not illustrated) configured to support the left end of
the spool shaft 2 in such a manner as to be movable in the
axial direction and to be non-rotatable. Inside the left cover
member 12B, there is provided a spool sound generation
mechanism (not illustrated) configured to generate a sound
in response to the rotation of the spool 3.

As illustrated in FIGS. 1 and 2, a bulge portion 122
projecting in a radial direction and also projecting outward
in the axial direction is formed on the right cover member
12A on the handle 4 side. As illustrated in FIG. 3, the
rotation transmission mechanism 5 is attached to the bulge
portion 122. A first support tubular portion 123 for supporting a handle shaft 40 of the handle 4 and a second support tubular portion 124 for supporting a drag lever 80 are formed on the bulge portion 122. Each of the first support tubular portion 123 and the second support tubular portion 124 is formed to protrude outward in the axial direction.

Spool Shaft

As illustrated in FIG. 3, the spool shaft 2 is supported by the boss portion (not illustrated) of the left cover member 12B and the right cover member 12A in such a manner as to be movable in the axial direction and to be non-rotatable. The spool shaft 2 rotatably supports the spool 3 by two bearings, i.e., a first bearing 221 and a second bearing 222, disposed on an outer peripheral surface of the spool shaft 2. The first bearing 221 is biased inward in the axial direction (rightward in FIG. 3) by a biasing member 64 such as a disc spring. The second bearing 222 is biased inward in the axial direction (leftward in FIG. 3) by a coil spring (not illustrated). Inward movements of the first bearing 221 and the second bearing 222 are restricted at inner side surfaces thereof in the axial direction by the spool 3 and the spool shaft 2. This makes it possible for the spool shaft 2 and the spool 3 to move integrally in the axial direction. The spool shaft 2 moves together with the spool 3 in the axial direction by the drag mechanism 6.

Spool

As illustrated in FIG. 3, the spool 3 includes a bobbin trunk portion 31 and flange portions 32 integrally formed at both ends of the bobbin trunk portion 31. A drag disc 61 constituting the drag mechanism 6 is fixed to an end surface of the flange portion 32A on the right side by a screw.

Handle

As illustrated in FIGS. 1 and 2, the handle 4 is fixed to a protruding end of the tubular handle shaft 40 disposed below the spool shaft 2 and parallel to the spool shaft 2. The handle shaft 40 is rotatably supported by the reel body 10. The handle 4 includes a handle arm 41 with a through hole formed therein (not illustrated) in a direction intersecting a longitudinal direction, and a handle grip 42 rotatably mounted on a leading end portion of the handle arm 41. The handle arm 41 is a plate-like member made of a metal, and the handle shaft 40 is attached in the above-mentioned through hole having a non-circular shape formed in a base end portion of the handle arm 41 in an integrally rotatable manner.

Rotation Transmission Mechanism

As illustrated in FIG. 3, the rotation transmission mechanism 5 includes a gear shifting operation mechanism 50 that can switch between two speeds, i.e., high and low speeds. The gear shifting operation mechanism 50 includes a first main gear (not illustrated) for high-speed winding and a second main gear (not illustrated) for low-speed winding, which are rotatably supported on the handle shaft 40 of the handle 4, a first pinion gear 53 and a second pinion gear 54, which are rotatably mounted on the spool shaft 2 in a state of engaging with the first main gear and the second main gear respectively, an engagement piece (not illustrated) for coupling one of the first main gear and the second main gear to the handle shaft 40 so as to transmit rotation, and an operation shaft 55 for setting the position of the engagement piece to one of a high-speed position to engage with the first main gear 51 and a low-speed position to engage with the second main gear 52. The operation shaft 55 is biased outward in the axial direction and toward the second main gear 52 side via the engagement piece by a spring member (not illustrated).

The first pinion gear 53 is a tubular member made of a corrosion-resistant metal such as a non-magnetic stainless alloy. The right end of the first pinion gear 53 is rotatably supported by a fourth bearing 531 mounted on the bulge portion 122 at the outer side of the spool shaft 2. The left end of the first pinion gear 53 is engaged with a pinion gear collar 62 of the drag mechanism 6 in an integrally rotatable manner. The second pinion gear 54 is a tubular member made of the same material as that of the first pinion gear 53, and the left end thereof is engaged with the drag disc 61 in an integrally rotatable manner. The engagement piece is non-rotatably disposed in a slit of the handle shaft 40.

As illustrated in FIG. 1, the operation shaft 55 is inserted through a through hole of the handle shaft 40. An end portion of the operation shaft 55 on the right side in FIG. 1 protrudes outward in the axial direction of the handle arm 41 (rightward in FIG. 1), and the operation shaft 55 can be pushed leftward in FIG. 1. The operation shaft 55 is freely supported in the axial direction by a nut member (not illustrated) for fixing the handle 4, which is screwed into the protruding end of the handle shaft 40, to the handle shaft 40.

Drag Mechanism

As illustrated in FIG. 3, the drag mechanism 6 includes: the drag disc 61 non-rotatably mounted on the spool 3; the pinion gear collar 62 to which the rotation from the handle 4 is transmitted, disposed facing a first surface on the handle 4 side of the drag disc 61, and immovable in the spool shaft direction; a drag receiver 63 to which the rotation from the handle 4 is transmitted, disposed facing a second surface on the opposite side to the handle 4 of the drag disc 61, and movable in the spool shaft direction in conjunction with the spool shaft 2; the biasing member 64 configured to bias the drag disc 61 and the drag receiver 63 in a direction in which the drag disc 61 and the drag receiver 63 are separated from each other; and a movement mechanism 65 for reciprocating the spool shaft 2 in the axial direction.

The drag disc 61 is a disc-shaped brake disc made of stainless steel and rotates together with the spool 3. The drag disc 61 extends toward the inner side in the radial direction of the spool shaft 2 from the outer peripheral portion of the flange portion 32A on the handle side (right side) of the spool 3. A coil spring 23 is interposed between the flange portion 32A on the right side of the spool 3 and the drag disc 61 to separate the drag disc 61 from the flange portion 32A on the right side. The coil spring 23 biases the drag disc 61 to the right side along with the rightward movement of the spool 3 until the drag lever 80 reaches an intermediate position P1 between a free position P0 and a maximum position P2. At this time, the drag disc 61 is brought into contact with a first friction plate 621 (described below) of the pinion gear collar 62 to generate a frictional force, thereby generating a drag force.

The pinion gear collar 62 forms a disc-shaped disc portion extending from a gear portion (the first pinion gear 53) that rotates together with the rotation of the handle 4 toward the outer side in the radial direction of the spool shaft 2. The pinion gear collar 62 includes the first friction plate 621 facing the first surface 61a of the drag disc 61. The pinion gear collar 62 includes a protrusion (not illustrated) extending toward the drag receiver 63 in the spool shaft direction.

The drag receiver 63 is movable in the spool shaft direction together with the spool shaft 2, and forms the disc-shaped disc portion extending toward the outer side in the radial direction of the spool shaft 2. The drag receiver 63 is provided rotatable relative to the spool shaft 2 via a third bearing 632. The drag receiver 63 includes a second friction plate 631 facing the drag disc 61. The drag receiver 63 includes a hole (not illustrated) for movable engagement along the protrusion of the pinion gear collar 62, and rotates together with the pinion gear collar 62.

The first friction plate 621 of the pinion gear collar 62 and the second friction plate 631 of the drag receiver 63 are washer-shaped disc members made of a wear-resistant material such as carbon graphite or fiber-reinforced resin, for example, and are fixed to the outer side surfaces by a plurality of mounting bolts disposed at intervals in the circumferential direction.

The biasing member 64 employs a corrugated annular coil spring of a multilayer winding type exhibiting linearity under a high load condition as compared with a disc spring and having a characteristic that a stable drag curve can be obtained.

By swinging the drag lever 80 from the intermediate position P1 toward the maximum position P2, the biasing member 64 presses the drag receiver 63 to the right side by the biasing force of the biasing member 64. With this, the second friction plate 631 of the drag receiver 63 comes into contact with the drag disc 61, which had been in contact with the first friction plate 621 of the pinion gear collar 62, from the left side. That is, the drag disc 61 is clamped between the first friction plate 621 and the second friction plate 631 to generate a frictional force, thereby generating a larger drag force.

The biasing force of the coil spring 23 is smaller than that of the biasing member 64 and acts before the biasing force of the biasing member 64 acts (in a range from the free position P0 to the intermediate position P1). Thus, in the drag mechanism 6, the drag force is exerted only by the biasing force of the coil spring 23 in the range from the free position P0 to the intermediate position P1, and the drag force is exerted by the biasing force of the biasing member 64 in addition to the biasing force of the coil spring 23 in a range from the intermediate position P1 to the maximum position P2.

As illustrated in FIG. 3, the movement mechanism 65 moves the spool shaft 2 to the side opposite to the handle (left side) so that the drag disc 61, the pinion gear collar 62, and the drag receiver 63 are separated from each other in the spool shaft direction in response to the movement of the drag lever 80 from the maximum position P2 side to the free position P0 side, and moves the spool shaft 2 to the handle 4 side (right side) so that the pinion gear collar 62 and the drag receiver 63 clamp the drag disc 61 in response to the movement of the drag lever 80 from the free position P0 side to the maximum position P2 side.

As described above, in the drag mechanism 6, in response to the movement of the drag lever 80 from the free position P0 to the maximum position P2 side, the spool shaft 2 is moved to the handle 4 side (right side) so that the drag disc 61 is clamped by the pinion gear collar 62 and the drag receiver 63, and the rotation of the spool 3 in the reel-out direction is braked.

Figure 4:
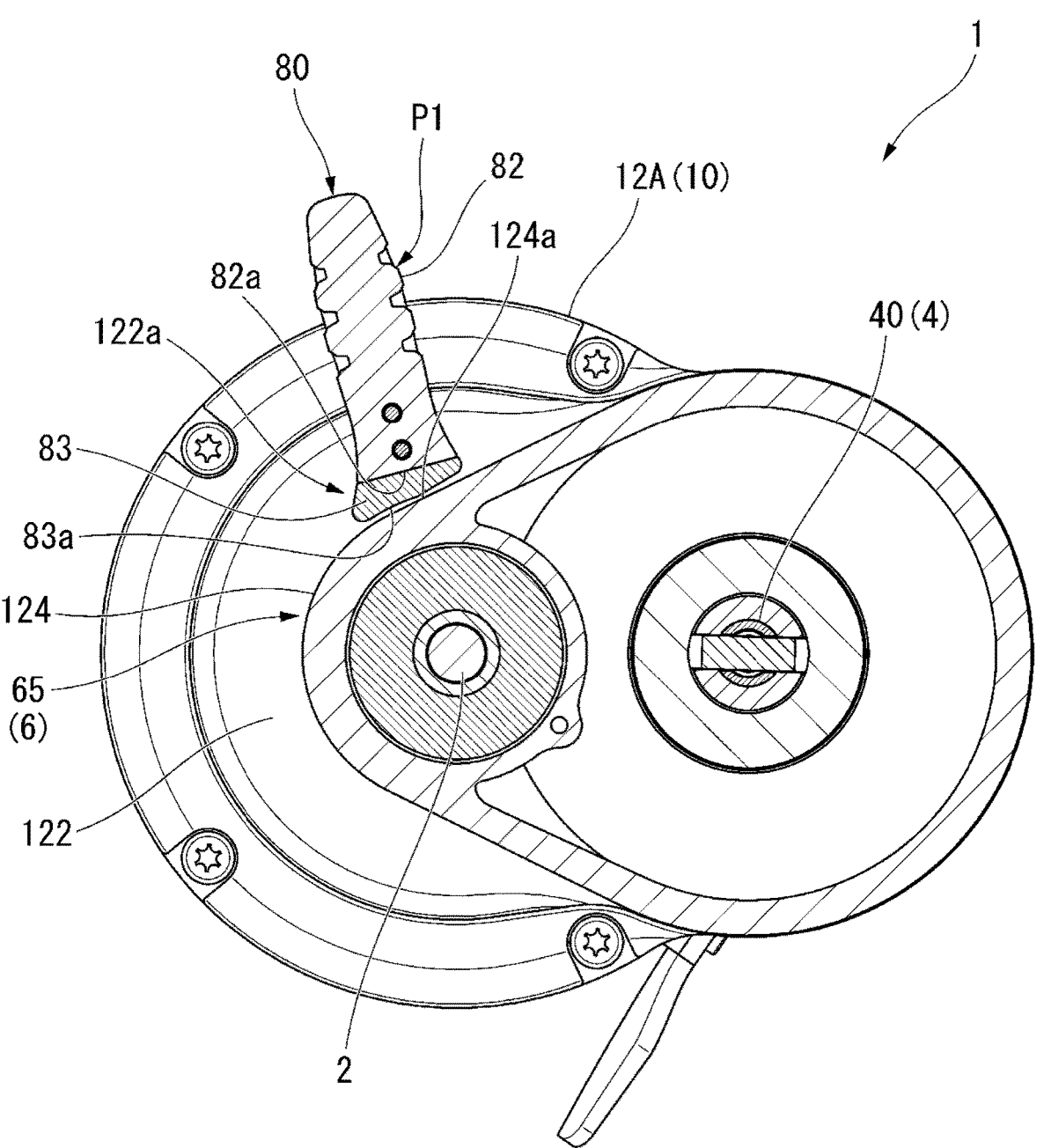
FIG. 4 is a longitudinal cross-sectional view of the
baitcasting reel illustrated in FIG. 2.
Figure 5:
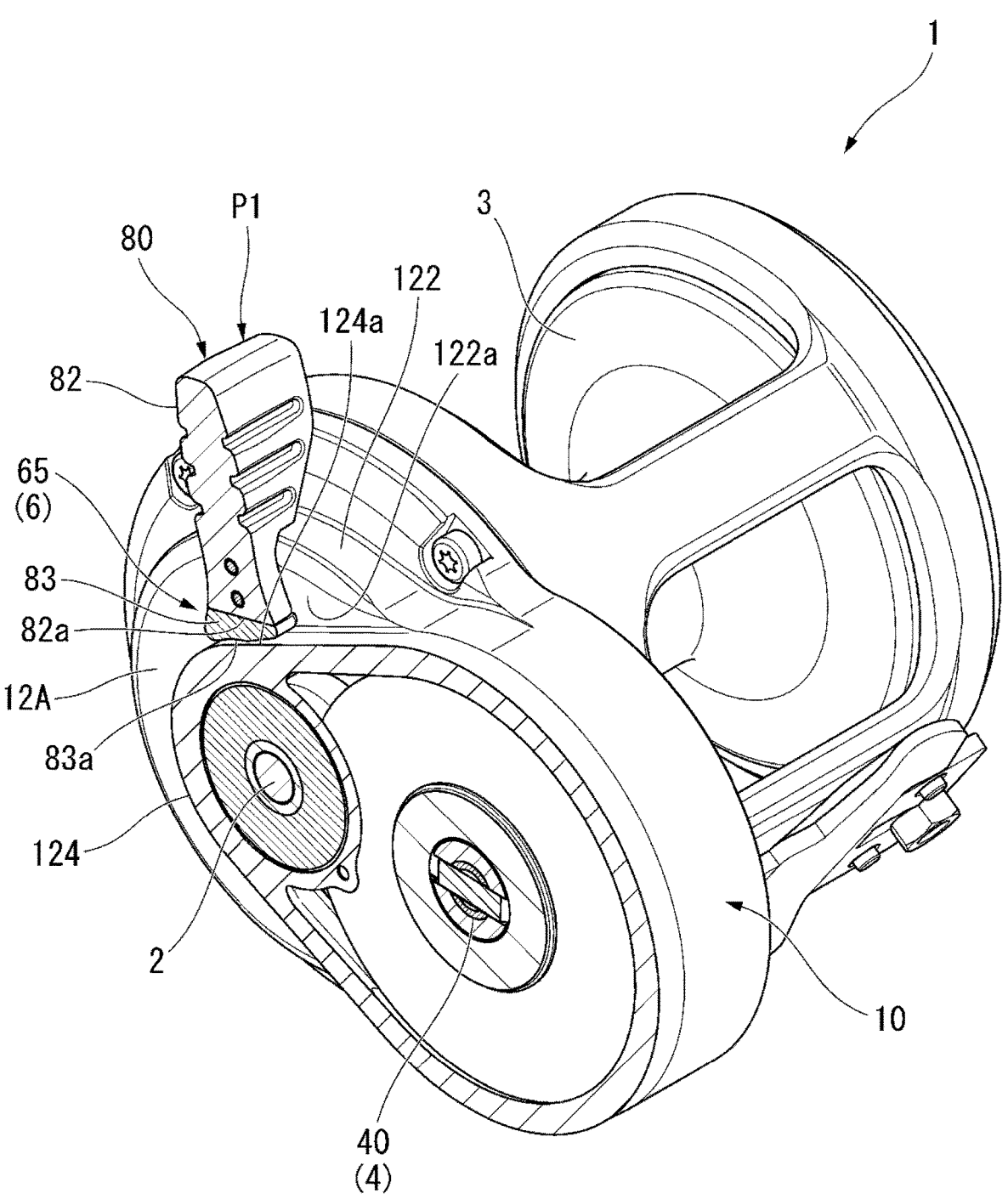
FIG. 5 is a partially cutaway perspective view of a
baitcasting reel as seen from a diagonally front side.
Figure 6:
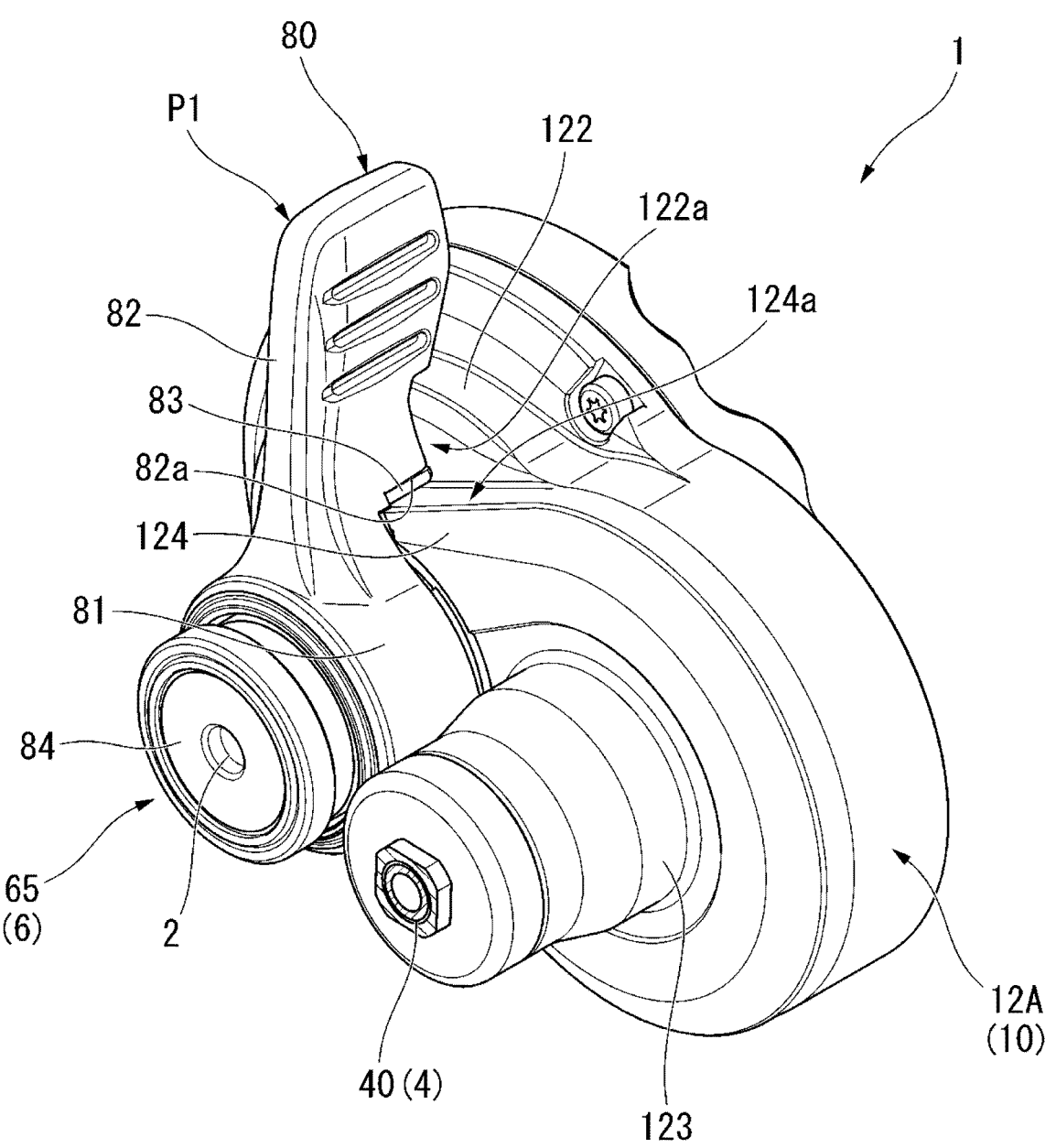
FIG. 6 is a partial perspective view of a baitcasting reel as
seen from a diagonally front side.

To be specific, as illustrated in FIGS. 4 to 6, the movement mechanism 65 includes the drag lever 80 swingably mounted on an outer peripheral surface 124a (second surface) of the second support tubular portion 124 of the right cover member 12A, a pulling mechanism (not illustrated) for pulling and moving the spool shaft 2 to the right in response to the clockwise swing of the drag lever 80 illustrated in FIG. 2, the biasing member 64 for biasing and moving the spool shaft 2 to the left in response to the counterclockwise movement of the drag lever 80, and a drag adjustment knob 84 mounted on the end portion of the spool shaft 2 supported by the second support tubular portion 124 and used for adjusting the braking force of the drag lever 80.

Drag Lever

As illustrated in FIGS. 7 to 10, the drag lever 80 is swingably mounted on the outer peripheral portion (second surface 124a) of the second support tubular portion 124 of the right cover member 12A between the free position P0 corresponding to a drag free state in which the spool 3 (see FIG. 3) is freely rotatable and the maximum position P2 corresponding to a maximum drag state of the drag mechanism, and a first operation range T1 is restricted in such a manner that the swing is made between the free position P0 and the maximum position P2.

Here, as for the drag lever 80, a direction orthogonal to a swing center C of the drag lever 80 is referred to as a radial direction, the swing center C side in the radial direction is referred to as a radially inner side, and the opposite side (a protruding leading end side of an operation portion 82 described below) is referred to as a radially outer side in the following description.

The drag lever 80 includes a mounting portion 81 swingably (rotatably) mounted on the outer peripheral portion of the second support tubular portion 124 extending to the radially outer side of the spool shaft 2 and protruding laterally from the right cover member 12A, the operation portion 82 that extends from the upper surface of the mounting portion 81 toward the leading end portion (radially outer side) and that can swingably operate in a front-rear direction, and an operation range adjustment member 83 (adjustment portion) mounted on the operation portion 82 and configured to adjust the first operation range T1 (the operation range from the free position P0 to the maximum position P2) of the operation portion 82 to a second operation range T2 (the operation range from the free position P0 to the intermediate position P1). The intermediate position P1 is a position between the free position P0 and the maximum position P2.

The mounting portion 81 is non-rotatably locked to a cam member (not illustrated) constituting the movement mechanism 65 (see FIGS. 5 and 6), and is configured to move the spool shaft 2 and the spool 3 in the spool shaft direction in response to the swing operation on the operation portion 82. The mounting portion 81 is a tubular portion having a substantially circular outer shape. The spool shaft 2 is attached to a central portion of a side surface of the mounting portion 81, and the drag adjustment knob 84 having a cap shape is mounted on the end portion of the spool shaft 2. The operation portion 82 is integrally formed with the mounting portion 81.

The operation portion 82 is adapted to be operated swingably in the front-rear direction (the front direction is a clockwise direction in FIG. 9, while the rear direction is a counterclockwise direction in FIG. 9) in the first operation range T1. As illustrated in FIGS. 5 and 6, the operation portion 82 is swingably disposed at a position facing each of a side surface 122a of the bulge portion 122 of the right cover member 12A and the outer peripheral surface 124a (second surface) of the second support tubular portion 124 with a slight gap therebetween. The second surface 124a is a portion extending in an arc shape.

The operation portion 82 includes an inner end surface 82a facing the outer peripheral surface 124a extending in a circumferential direction of the second support tubular portion 124 with an integral interval therebetween in the radial direction. The operation range adjustment member 83 is fixed to the inner side in the spool shaft direction of the inner end surface 82a, and an engagement pin 85 described below is provided on the outer side in the spool shaft direction of the operation range adjustment member 83.

In this case, the second support tubular portion 124 is disposed to protrude from the side surface 122a of the bulge portion 122 of the right cover member 12A. A contact surface 83a (described below) of the operation range adjustment member 83 mounted on the operation portion 82 is brought into contact with the outer peripheral surface 124a of the second support tubular portion 124, thereby positioning the drag lever 80 at the intermediate position P1.

Operation Range Adjustment Member

As illustrated in FIGS. 7 to 10, the operation range adjustment member 83 is a block-shaped spacer member. The operation range adjustment member 83 is mounted on the inner end surface 82a of the operation portion 82, the mounting position thereof in the operation portion 82 can be relatively adjusted, and the operation range adjustment member 83 is detachably mounted. The operation range adjustment member 83 is mounted on the inner end surface 82a facing the outer peripheral surface 124a side of the right cover member 12A in the operation portion 82, and is provided close to a pressing plate 86 described below.

The operation range adjustment member 83 includes the contact surface 83a (first surface) that faces the outer peripheral surface 124a of the second support tubular portion 124 in the radial direction and that can make contact with the outer peripheral surface 124a in accordance with the swing position of the operation portion 82. The operation range adjustment member 83 is a member that can position the drag lever 80 at the intermediate position P1 between the free position P0 and the maximum position P2 by bringing part of the contact surface 83a into contact with the outer peripheral surface 124a. The contact surface 83a approaches and comes into contact with the outer peripheral surface 124a as the operation portion 82 is swung from the free position P0 to the maximum position P2 side. Specifically, part of the contact surface 83a starts to come into contact with the outer peripheral surface 124a at the intermediate position P1, and the contact area increases as the swing is performed from the intermediate position P1 toward the maximum position P2. As described above, by changing the contact position at which the contact surface 83a of the operation range adjustment member 83 comes into contact with the outer peripheral surface 124a, the first operation range T1 can be changed to the second operation range T2 by the operation portion 82.

Figure 9:
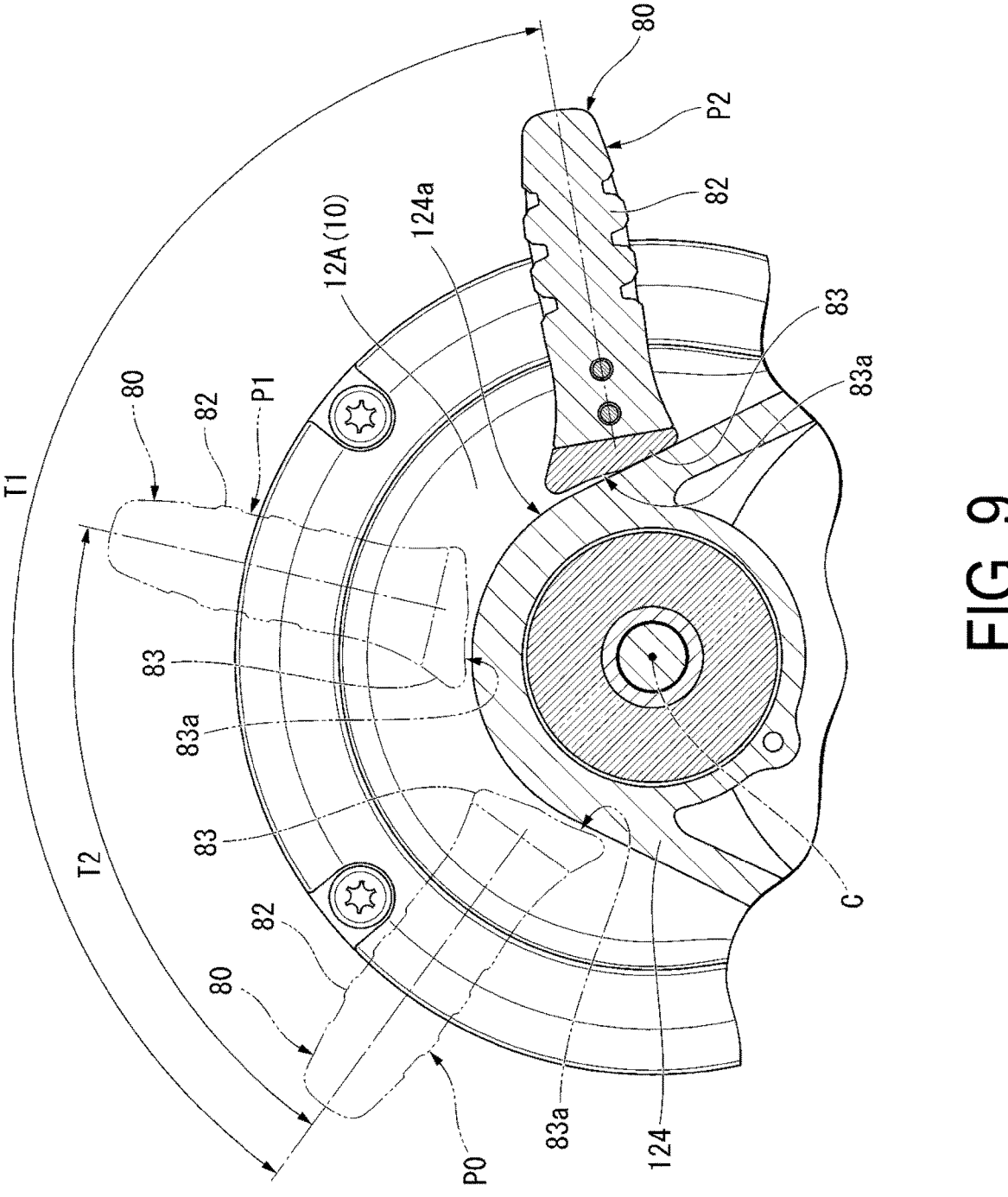
FIG. 9 is a cutaway side view illustrating an operation
range of a drag lever as seen from an outer side thereof in
the spool shaft direction.

In this manner, as illustrated in FIG. 9, when the drag lever 80 is swung from the free position P0 toward the intermediate position P1, part of the contact surface 83a of the operation range adjustment member 83 comes into contact with the outer peripheral surface 124a of the second support tubular portion 124 of the right cover member 12A, and thus the operation range adjustment member 83 can position the drag lever 80 at the intermediate position P1. The intermediate position P1 of the drag lever 80 is normally set at approximately one third the tensile strength of the fishing line.

Figure 7:
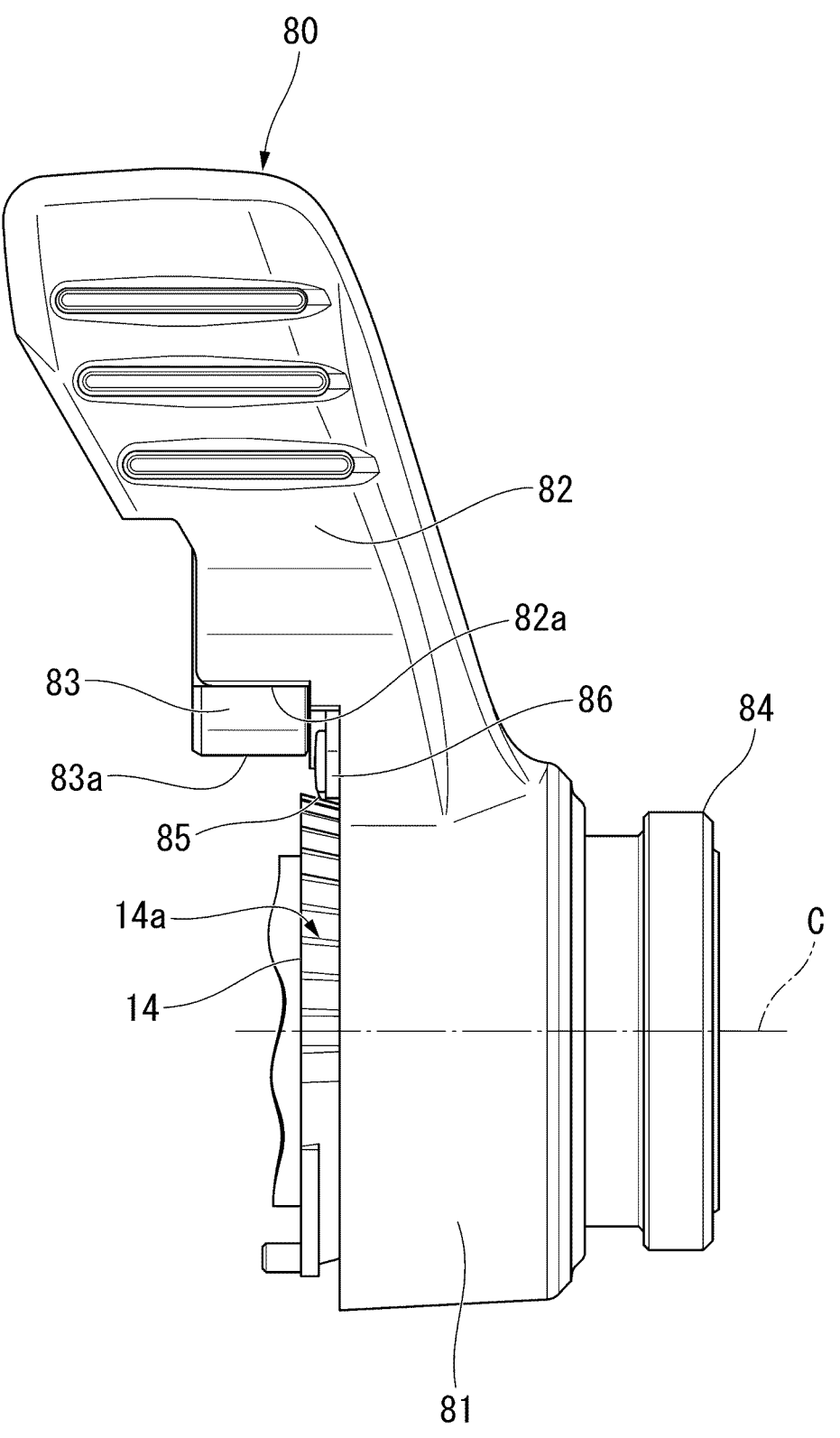
FIG. 7 is a side view of a drag lever as seen from a rear
side.
Figure 8:
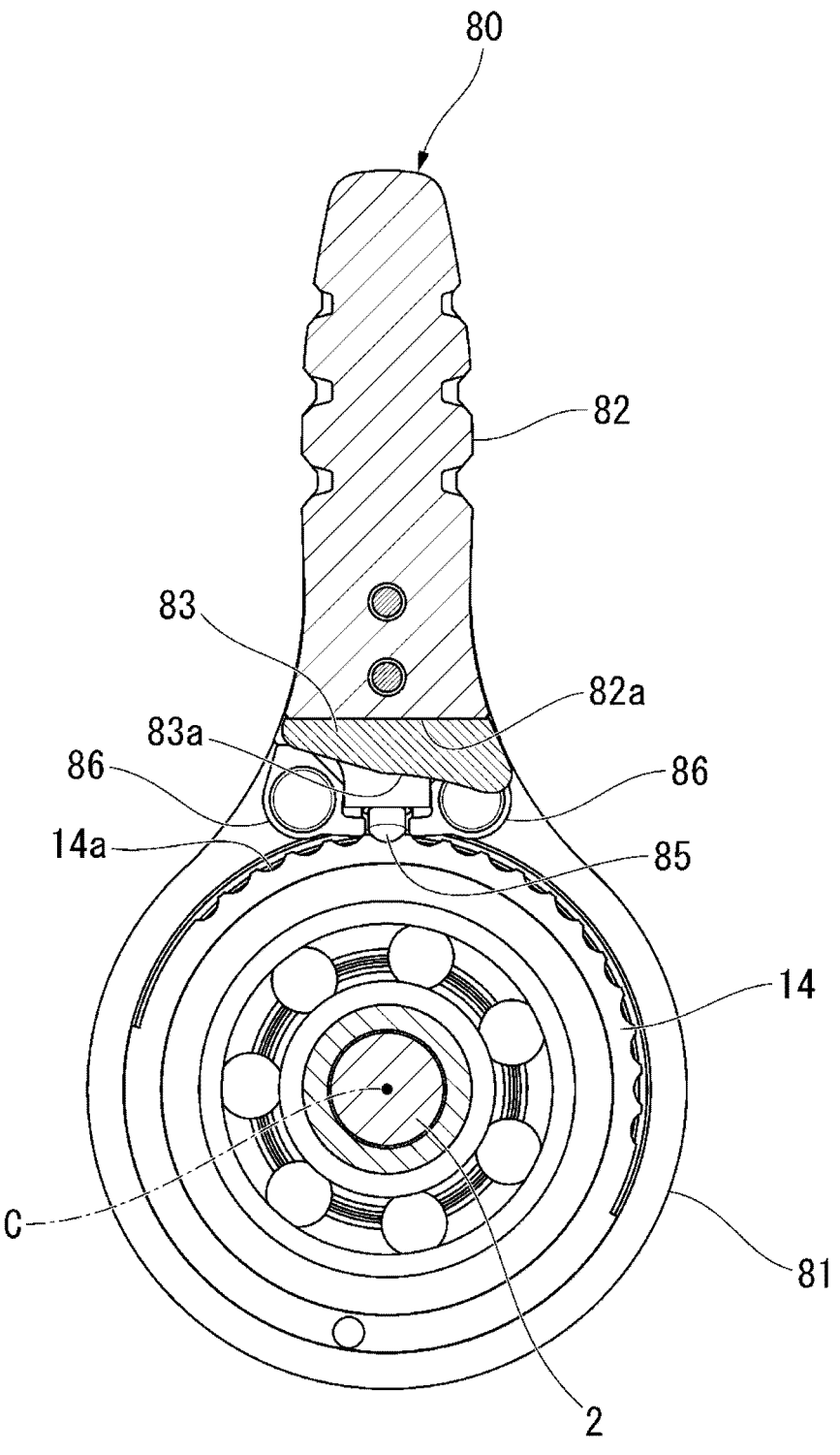
FIG. 8 is a cutaway side view of a drag lever as seen from
an inner side thereof in a spool shaft direction.

As illustrated in FIGS. 7 and 8, the right cover member 12A includes a concave-convex portion 14a (second positioning portion) configured to engage with the engagement pin 85, on the second support tubular portion 124 facing the operation portion 82. The concave-convex portion 14a is formed on part of an outer peripheral edge of a sound generation member 14 having a ring shape that is non-rotatably supported on the outer peripheral surface 124a of the second support tubular portion 124 and is formed coaxially with the spool shaft 2. The concave-convex portion 14a is formed along the swing direction of the mounting portion 81, and is engaged with the engagement pin 85 described below.

The contact surface 83a of the operation range adjustment member 83 includes the engagement pin 85 (first positioning portion) and the pressing plate 86 (holding portion) configured to hold the engagement pin 85 in the operation portion 82. The engagement pin 85 and the pressing plate 86 are located between the operation range adjustment member 83 and a base end portion of the operation portion 82. When the drag lever 80 is rotated, the engagement pin 85 generates a moderate clicking sound.

Figure 10:
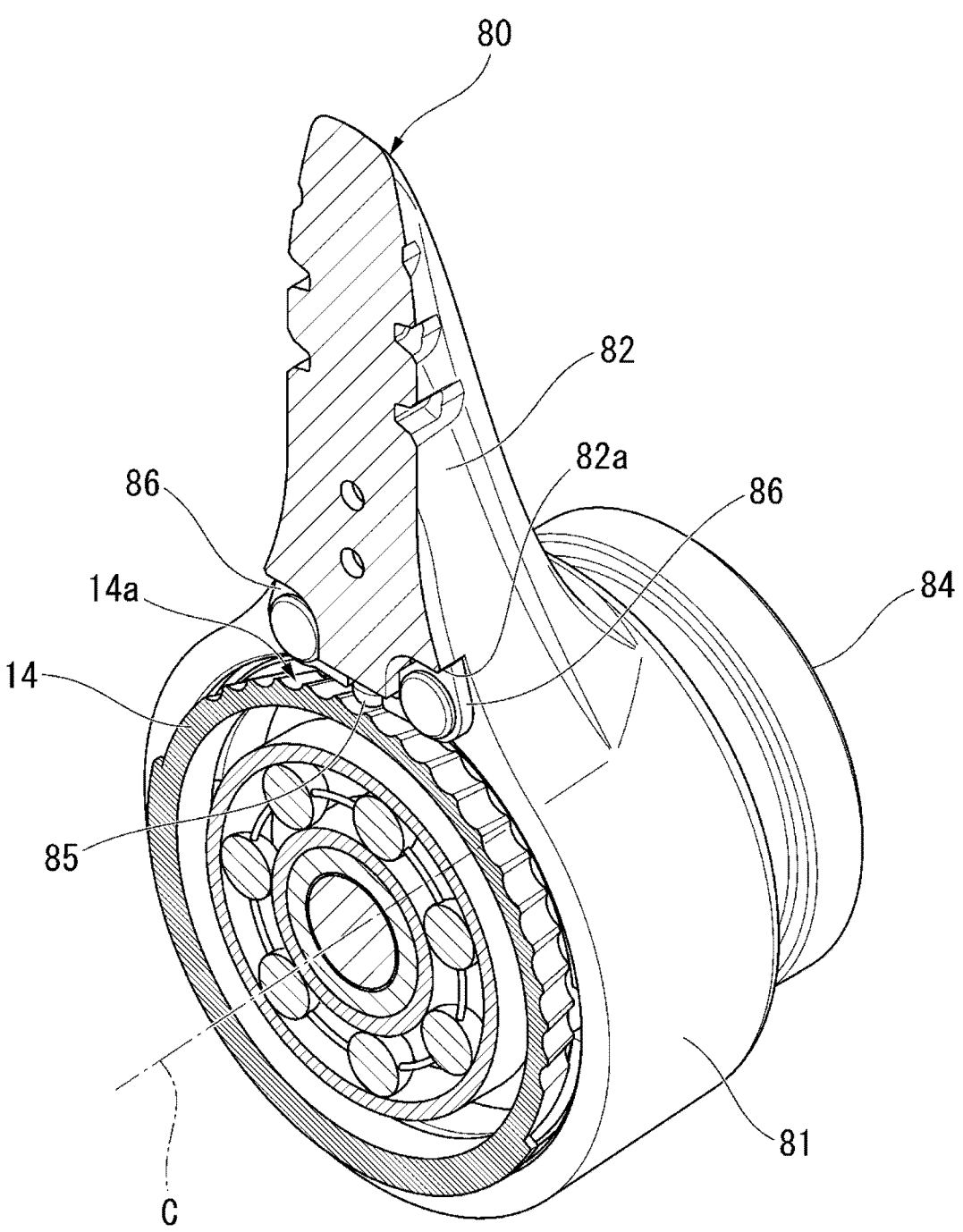
FIG. 10 is a partially cutaway perspective view of a drag
lever.

As illustrated in FIG. 10, the tubular sound generation member 14 is mounted to the outer peripheral surface 124a of the right cover member 12A, the tubular sound generation member 14 being configured to support, on its inner circumference side, a bearing 15 for rotatably supporting the spool 3. The sound generation member 14 is fixed non-rotatably relative to the right cover member 12A. On the outer peripheral surface of the sound generation member 14, the concave-convex portion 14a, configured to generate a sound by engaging with the engagement pin 85, is continuously formed along the circumferential direction. The concave-convex portion 14a may be formed in a set arc region (in other words, a region corresponding to the operation range of the operation portion 82) of the outer peripheral surface of the ring-shaped sound generation member 14, or may be formed over the entire circumference.

Figure 11:
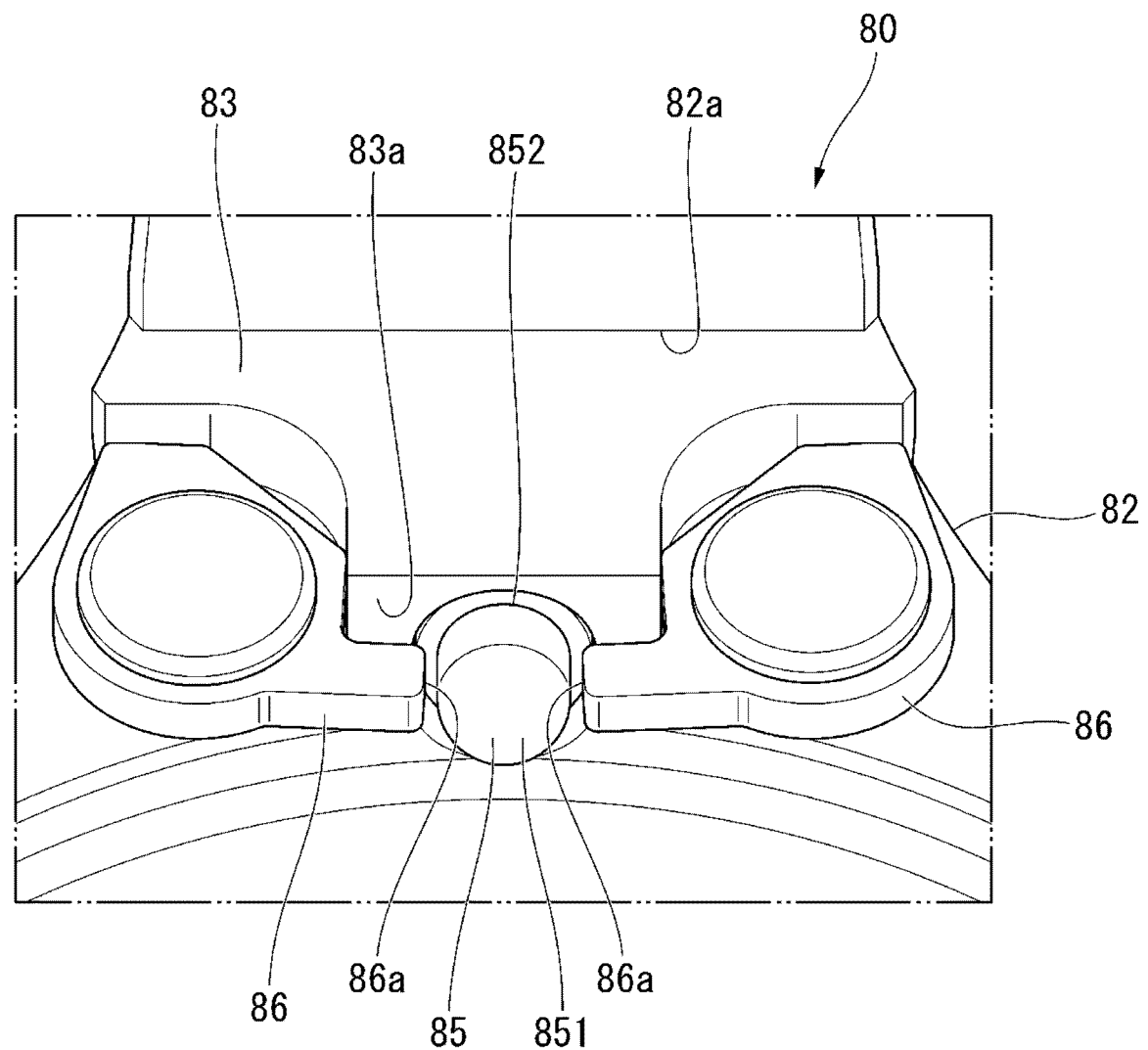
FIG. 11 is a perspective view illustrating an engagement
pin.
Figure 12:
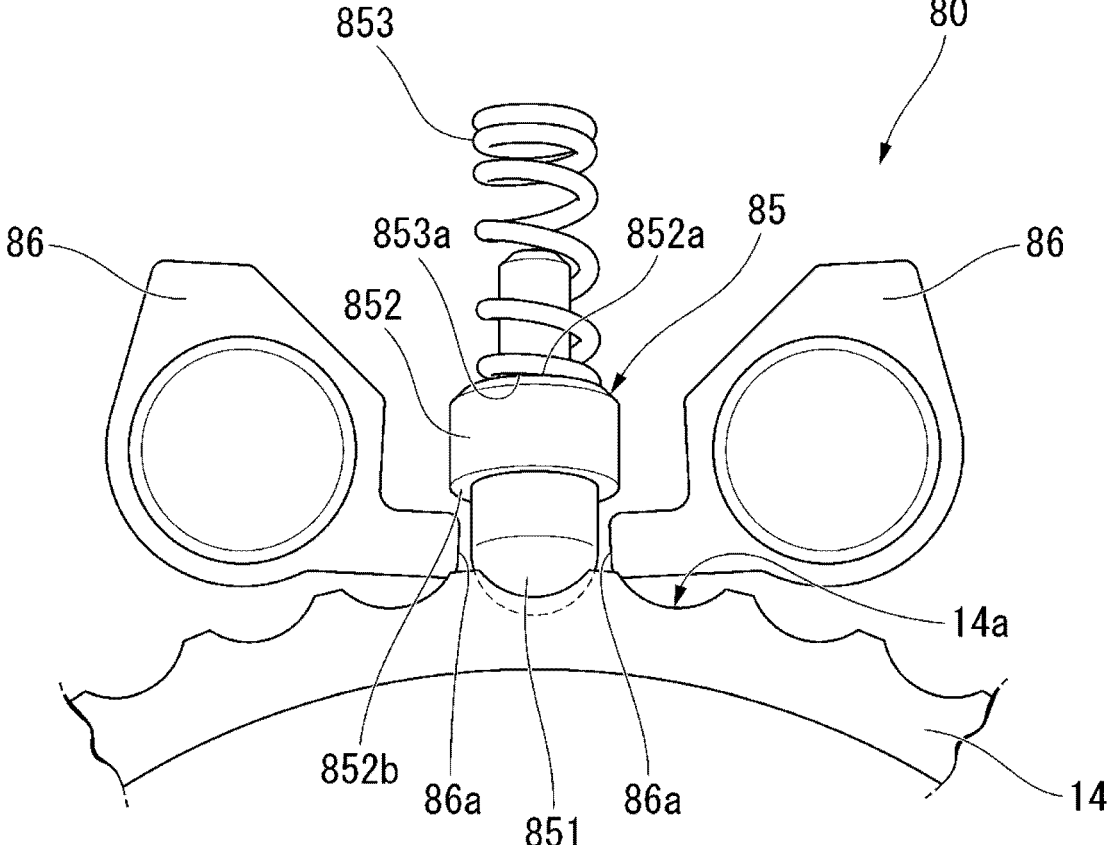
FIG. 12 is a side view illustrating an engagement state
between an engagement pin and a concave-convex portion.

As illustrated in FIGS. 11 and 12, the engagement pin 85 is mounted on a base portion on the mounting portion 81 side of the operation portion 82. The engagement pin 85 is movable toward and away from the concave-convex portion 14a of the sound generation member 14. A pin tip portion 851 of the engagement pin 85 protrudes toward a radially inner side (toward the swing center C side) from the inner end surface 82a of the operation portion 82. The engagement pin 85 includes the pin end portion 851 having a tubular shape, a large-diameter tubular portion 852 having a larger diameter than the pin end portion 851 that is integral with the base end side of the pin end portion 851, and a spring member 853 configured to bias the pin end portion 851 toward the outer peripheral surface 124a side (protruding direction).

The spring member 853 is incorporated into a hole (not illustrated) formed in the inner end surface 82a of the operation portion 82, and one end 853a of the spring member 853 is in contact with an outer end surface 852a on the opposite side to the pin end side of the large-diameter tubular portion 852. As a result, the engagement pin 85 is elastically biased relative to the concave-convex portion 14a of the sound generation member 14, and then a clicking sound is generated by the elastic engagement relationship between the concave-convex portion 14a and the engagement pin 85 when the drag lever 80 is rotated. The sound quality and volume may be changed by the combination of the constituent material of the sound generation member 14 and the depth and pitch of the concave-convex portion 14a.

A pair of pressing plates 86 are provided on both sides of the engagement pin 85 as viewed from the axial direction of the pin, and each of the pressing plates 86 is fixed to the operation portion 82. Opposing tip portions 86a of the pair of pressing plates 86 are mounted on the operation portion 82 each overlapping an inner end surface 852b of the large-diameter tubular portion 852 as viewed from the axial direction of the pin. As a result, the engagement pin 85 is restricted by the pressing plates 86 from moving in a protruding direction (radially inner side direction) due to being biased by the spring member 853, so that the engagement pin 85 is restricted from coming off.

In the baitcasting reel 1 configured as described above, the drag lever 80 is swung with the drag force of the drag mechanism 6 adjusted to be strong or weak, as illustrated in FIG. 9. When the drag lever 80 is at a drag release position (free position P0)), which is a swing position on the frontmost side in FIG. 1, in the drag mechanism 6, the pinion gear collar 62 and the drag receiver 63 are separated from the drag disc 61 to establish a drag release state, so that the spool 3 becomes freely rotatable, as illustrated in FIG. 3. This makes it possible to perform casting. When the drag lever 80 is swung clockwise, as illustrated in FIG. 9, from the above-discussed position, the movement is gradually carried out outward in the spool shaft direction (rightward in FIG. 3), so that the spool shaft 2 and the spool 3 gradually move rightward. As a result, the force with which the pinion gear collar 62 and the drag receiver 63 are pressed against the drag disc 61 increases, and consequently the drag force increases.

Then, as illustrated in FIG. 9, when the drag lever 80 is swung from the free position P0 toward the intermediate position P1, part of the contact surface 83*a* of the operation range adjustment member 83 comes into contact with the outer peripheral surface 124*a* of the second support tubular portion 124 of the right cover member 12A, and thus the drag lever 80 is positioned at the intermediate position P1. Further, when the drag lever 80 is swung forward relative to the intermediate position P1, the contact area between the contact surface 83*a* and the outer peripheral surface 124*a* increases, and the drag lever 80 reaches the maximum position P2 at a position where substantially the entire contact surface 83*a* is in contact with the outer peripheral surface 124*a*. Then, the swing of the drag lever 80 is stopped, and the drag mechanism 6 enters the maximum drag state.

Next, operations of the drag lever 80 and the baitcasting reel 1 configured as discussed above will be described in detail with reference to the drawings.

The drag lever 80 according to the present embodiment adjusts the braking force of the drag mechanism 6, which is configured to brake the rotation of the spool 3. The drag lever 80 includes the mounting portion 81 rotatably mounted on the reel body 10, the operation portion 82 extending from the mounting portion 81 in the radial direction of the pivot shaft and configured to swing in the first operation range T1, and the operation range adjustment member 83 mounted on the operation portion 82 and configured to adjust the first operation range T1 of the operation portion 82 to the second operation range T2.

In this case, a predetermined operation range of the drag lever 80 can be set by the operation range adjustment member 83 mounted on the operation portion 82, thereby making it possible to adjust the braking force of the drag mechanism 6. Due to this, the operation range can be adjusted from the first operation range T1 to the second operation range T2 by the operation range adjustment member 83 so as to be at the intermediate position P1 between the free position P0, which is a drag release position, and the maximum position P2, where the braking force of the drag mechanism 6 is in a maximum drag state.

In the present embodiment, since the operation range adjustment member 83 is mounted on the operation portion 82 of the drag lever 80, a configuration in which a protrusion for defining the operation range of the drag lever 80 protrudes from the side surface of the reel body 10 can be eliminated. This makes it possible to suppress entanglement of the fishing line on the side surface of the reel body 10 during fishing.

Further, in the present embodiment, since the operation range adjustment member 83 is not mounted on the side surface of the reel body 10 as in the related art, the operation range adjustment member 83 is not exposed on the reel body 10; consequently, the external appearance is not degraded and an excellent design is achieved.

In the present embodiment, since the operation range adjustment member 83 is mounted on the operation portion 82 so that the relative position thereof can be adjusted, the operation range of the drag lever 80 can be optionally adjusted by optionally changing the position of the operation range adjustment member 83 relative to the operation portion 82.

In the present embodiment, the operation range adjustment member 83 is detachably mounted on the operation portion 82.

In this case, since the operation range adjustment member 83 is attachable to and detachable from the operation portion 82, the operation range of the drag lever 80 can be optionally adjusted by selecting the operation range adjustment member 83 that is appropriate among operation range adjustment members 83 having different shapes and dimensions, for example, and mounting the selected member to at least one of the mounting portion and the operation portion 82.

In the present embodiment, the operation range adjustment member 83 is configured to change the operation range of the operation portion 82 by being mounted on the operation portion 82 and brought into contact with the reel body 10.

Thus, the operation range adjustment member 83 is mounted on the operation portion 82 displaced relative to the reel body 10 by the swing operation of the drag lever 80, and the operation range adjustment member 83 is adjusted to come into contact with the reel body 10 at a predetermined swing position, thereby making it possible to set to the operation range of the operation portion 82.

In the present embodiment, the operation range adjustment member 83 is preferably mounted on the contact surface 83*a* of the operation portion 82 facing the reel body 10.

Thus, since the operation range adjustment member 83 is mounted on the contact surface 83*a* facing the reel body 10, exposure of the operation range adjustment member 83 to the outside of the reel can be suppressed, and entanglement of a fishing line on the operation range adjustment member 83 can be more reliably suppressed.

In the present embodiment, since the operation range adjustment member 83 is provided close to the pressing plates 86, the operation range adjustment member 83 and the pressing plates 86 are provided being aggregated in the operation portion 82. As a result, the operation portion 82 does not have a complicated structure, and a member protruding from the operation portion 82 can be eliminated, thereby making it possible to prevent entanglement of a fishing line, where the fishing line is entangled on the operation portion 82 or the operation range adjustment member 83 during fishing.

With the drag lever 80 and the baitcasting reel 1 configured as discussed above according to the present embodiment, entanglement of a fishing line during fishing may be suppressed, and the operation range of the drag lever 80 may be adjusted.

The embodiment of the present invention has been described thus far, but the above embodiment is given merely as an example and is not intended to limit the scope of the invention. The embodiment may be implemented in other various forms, and various omissions, substitutions, and modifications may be made without departing from the spirit of the invention. The embodiment and modified examples thereof include, for example, those that can be easily conceived by those skilled in the art, those that are substantially the same, and those that fall within an equivalent range.

For example, in the above-described embodiment, although a medium-sized lever drag reel has been described as an example, the present invention is not limited thereto, and the present invention may be applied to any baitcasting reel as long as the reel is the baitcasting reel 1 including the drag lever 80.

In the present embodiment, a configuration in which the operation range adjustment member 83 (adjustment portion) is mounted on the operation portion 82 is cited as an example. However, the adjustment portion may be mounted on the mounting portion 81, or may be attached to both the mounting portion 81 and the operation portion 82.

The adjustment portion is not limited to the operation range adjustment member 83 as discussed in the above embodiment, and may have another configuration. In short, the adjustment portion is not required to be mounted on the reel body 10, but is only required to be attached to at least one of the mounting portion 81 and the operation portion 82.

Although the engagement pin 85 and the concave-convex portion 14a of the sound generation member 14 of the present embodiment are exemplified as having a sound generation function, they may also have a function of positioning the operation portion 82.

In this case, the drag lever 80 may be positioned, for example, at the intermediate position P1 between the free position P0 and the maximum position P2 by positioning the engagement pin 85 of the operation portion 82 to the concave-convex portion 14a on the reel body 10. Further in this case, since the engagement pin 85 is held by the pressing plates 86 such that it is able to move forward and backward and is engageengageable with the concave-convex portion 14a of the mounting portion 81, the engagement pin 85 engages with the concave-convex portion 14a in accordance with the swing position. Therefore, by disposing the concave-convex portion 14a over the entire operation range, the drag lever 80 can be positioned stepwise in the operation range.

REFERENCE SIGNS LIST

1 Baitcasting reel (Dual-bearing reel for fishing)
2 Spool shaft
3 Spool
4 Handle
6 Drag mechanism
10 Reel body
12A Right cover member
14 Sound generation member
14a Concave-convex portion (Second positioning portion)
80 Drag lever
81 Mounting portion 82 Operation portion
82a Inner end surface
83 Operation range adjustment member (Adjustment portion)
83a Contact surface (First surface)
85 Engagement pin (First positioning portion)
86 Pressing plate (Holding portion)
124 Second support tubular portion
124a Outer peripheral surface (Second surface)
P0 Free position
P1 Intermediate position
P2 Maximum position
T1 First operation range
T2 Second operation range

What is claimed is:

1. A drag lever configured to adjust a braking force of a drag mechanism configured to brake rotation of a spool, the drag lever comprising:
   a mounting portion rotatably mounted on a reel body;
   an operation portion extending from the mounting portion in a radial direction of a pivot shaft and configured to move in a first operation range; and
   an adjustment portion attached to at least one of the mounting portion and the operation portion and configured to adjust the first operation range of the operation portion to a second operation range;
   wherein the adjustment portion is relatively adjustably mounted on at least one of the mounting portion and the operation portion.

2. The drag lever according to claim 1, wherein the adjustment portion is detachably mounted on at least one of the mounting portion and the operation portion.

3. The drag lever according to claim 1, wherein the adjustment portion is mounted on the operation portion and changes the first operation range of the operation portion as such to contact with the reel body.

4. The drag lever according to claim 1, wherein the adjustment portion is mounted on a first surface facing the reel body of the operation portion.

5. The drag lever according to claim 1, wherein
   the operation portion includes a first positioning portion on a first surface facing the reel body of the operation portion, and
   the reel body includes a second positioning portion to be engaged with the first positioning portion on a second surface facing the operation portion.

6. The drag lever according to claim 5, wherein
   the first positioning portion includes an engagement pin movable toward and away from the second surface, and a holding portion configured to hold the engagement pin, and
   the second positioning portion includes a concave-convex portion that is formed along a swing direction of the mounting portion and is engaged with the engagement pin.

7. The drag lever according to claim 6, wherein the adjustment portion is provided close to the holding portion.

8. A dual-bearing reel for fishing, comprising:
   the drag lever according to claim 1.

* * * * *